United States Patent [19]
Yamagishi

[11] Patent Number: 5,624,172
[45] Date of Patent: Apr. 29, 1997

[54] PROJECTION TYPE IMAGE DISPLAY APPARATUS

[75] Inventor: Shigekazu Yamagishi, Takatsuki, Japan

[73] Assignee: Matsushita Electric Industrial Co., Ltd., Osaka, Japan

[21] Appl. No.: 550,530

[22] Filed: Oct. 30, 1995

[30] Foreign Application Priority Data

Nov. 1, 1994 [JP] Japan ............................. 6-267913

[51] Int. Cl.$^6$ ........................................ G03B 21/14
[52] U.S. Cl. ............................ 353/98; 353/122; 349/5
[58] Field of Search ........................ 353/102, 98, 38, 353/97, 122; 359/48, 49

[56] References Cited

U.S. PATENT DOCUMENTS

| | | | |
|---|---|---|---|
| 5,192,962 | 3/1993 | Nishida et al. | 353/98 |
| 5,473,393 | 12/1995 | Manabe | 353/38 |
| 5,491,525 | 2/1996 | Yamasaki et al. | 353/98 |
| 5,555,041 | 9/1996 | Manabe | 353/98 |

FOREIGN PATENT DOCUMENTS

| | | | |
|---|---|---|---|
| 0568998 | 11/1993 | European Pat. Off. . | |
| 6018842 | 1/1994 | Japan | 359/49 |
| 6110030 | 4/1994 | Japan | 359/49 |
| 61-38408 | 5/1994 | Japan . | |
| 62-73758 | 9/1994 | Japan . | |

*Primary Examiner*—William Dowling
*Attorney, Agent, or Firm*—Ratner & Prestia

[57] ABSTRACT

A projection type image display apparatus using a small light valve, particularly a liquid crystal light valve, to achieve high brightness, a sharp contrast and excellent uniformity in image displaying. The apparatus includes a light source with a light emitting area, an oval mirror to reflect the light from the light source and a light valve to control the reflected light. The oval mirror possesses two focal points, a first focal point located on one side of the light valve near the oval mirror and a second focal point located on the opposite side of the light valve. The light emitting area is situated at a position so as to include the first focal point of the oval mirror. When the distance, from the first focal point to the light valve which governs the effective light flux area of the light valve is defined as 'L' and the distance from the first focal point to the second focal point is defined as '2C', the relationship between 'L' and 'C' satisfies the following inequality:

$$0.6 < (L/C) < 1.1.$$

8 Claims, 8 Drawing Sheets

PRIOR ART      SECOND FOCAL POINT

PROJECTION TYPE IMAGE DISPLAY APPARATUS

BACKGROUND OF THE INVENTION

The present invention relates to a projection type image display apparatus utilizing a light valve.

A popular large screen display apparatus with high resolution and high brightness employs a light valve system for obtaining projected images by modulating light from a light source. In particular, the majority of the display apparatus includes a liquid crystal panel in the light valve system because of the compactness of the finished product and the needlessness of any specific maintenance provisions.

This projection type image display apparatus using a liquid crystal panel has features such as a good picture quality, an excellent light utilization efficiency, easy high temperature counter measures and the like. A liquid crystal panel of 2.8 to 3.2 inches in diagonal length, with amorphous silicon serving as a controller, is predominantly used as the light valve for this kind of apparatus.

Costs of the liquid crystal panel having amorphous silicon and other optical components used in the prior art are not readily reducible even if they are mass-produced because of the inherent nature of the processes employed in the production thereof.

On account of this, the prior art projection type image display apparatus tends to become too expensive to be widely used by general consumers.

Alternately, a projection type image display apparatus employing as the light valve a liquid crystal panel with a controller formed of polysilicon can be constructed. Since polysilicon can be processed to produce a much more dense device, when compared with amorphous silicon, a liquid crystal light valve of polysilicon can be made smaller, and at the same time it will be possible to increase the number of pixels and improve the aperture rate.

The aperture rate is defined as a ratio of the effective area of a liquid crystal light valve excluding inoperative areas due to the existence of black matrixes for the protection of wiring and the like to the effective area of the liquid crystal light valve.

A typical liquid crystal panel using polysilicon can be reduced in size to less than one half the size of a liquid crystal panel using amorphous silicon.

As a result, the peripheral optical systems are also made smaller and the whole apparatus will be made available to the market at a relatively lower price.

A parabolic mirror has been used in the source of illumination in the optical system of the prior art projection type image display apparatus employing a liquid crystal panel of 2.8 to 3.2 inches in diagonal length.

This kind of image display apparatus using a liquid crystal panel presents the following problems.

Firstly, when the parabolic mirror is reduced in size with a resultant reduction in size of the light emitting area of the light source, the life and light emitting efficiency of the light source decline.

Therefore, the light emitting area of the light source has to be made relatively large for the size of the reflector, resulting in a large reduction of the light-gathering efficiency of the reflector.

Secondly, the distance between the light emitting area of the light source and the reflector becomes small, thereby increasing the reflector's temperature. As a result, it becomes difficult to ensure reliability of the reflector.

FIG. 9 shows a conventional projection type image display apparatus employing a parabolic mirror 114 as the reflector.

In FIG. 9, a light source 102 is arranged on the optical axis 103, and the parabolic mirror 114 is disposed behind the light source 102.

A light-gathering lens 109 is arranged at a distance from a light valve 107, and the light from the parabolic mirror 114 is incident on the light valve 107 after having been focussed. The light from the light source 102 passes the parabolic mirror 114, the light-gathering lens 109, a light radiant side polarizer 108 and a projection lens 110 successively, and will be displayed on a screen (not shown in FIG. 9).

In the conventional projection-type image display of FIG. 9, it is necessary to use a brighter projection lens 110 having a smaller F-Number, about 2.8 for example.

When a brighter projection lens 110 with a smaller F-Number is used, it becomes difficult to control the positioning of the projection lens 110 and parabolic mirror 114, thereby reducing the freedom in lens designing.

On the other hand, since the light path from the parabolic mirror 114 to the light-gathering lens 109 is long, and the F-Number of the projection lens 110 is small, the overall light path tends to become long which makes it difficult to reduce the size of the projection type image display apparatus.

FIG. 10 shows a structure wherein an oval mirror is used as the reflector. In FIG. 10, a light source 202 is arranged on the optical axis 203, and an oval mirror 204 is disposed behind the light source 202.

The light from the light source 202 passes through a collimator lens 215, a light incident side polarizer 206, a light valve 207, a light radiant side polarizer 208, a light-gathering lens 209 and a projection lens 210 successively, and will be displayed on a screen (not shown in FIG. 10) finally.

Light source 202 is a light source having a small light emitting area such as a xenon lamp and the like.

A second focal point is located near the opening of the oval mirror 204.

The light reflected at the oval mirror 204 is incident on the light valve 207 after having been adjusted to a certain specified size of light beam by means of the collimator lens 215.

The conventional structures present problems such as less enhancement in the light-gathering efficiency, a marked decrease in the luminous energy in the periphery of images when compared with that in the center, an uneven distribution of brightness in images, and the like.

The object of the present invention is to solve the above problems and to provide a projection type image display apparatus including a light valve system, which makes it possible to display images with high brightness, uniform light intensity, sharp contrast and the like, and at the same time reduces the size of the apparatus.

SUMMARY OF THE INVENTION

A projection type image display apparatus of the present invention comprises a source of illumination, an image display device wherein images are formed by controlling the light emitted from the foregoing source of illumination, and a projection device whereby the images formed in the image display device are projected.

The source of illumination includes a light source and a reflector for reflecting the light from the light source in a desired direction.

The image display device includes a light valve for controlling the light emitted from the source of illumination according to an input signal from outside.

The projection device has a projection lens for controlling the light from the image display device.

The reflector is an oval mirror having an opening. The oval mirror has a first focal point located on one side of the light valve near the oval mirror and a second focal point located on the opposite side of the light valve.

At the least a part of the light emitting area of the light source is arranged to include the first focal point of the oval mirror.

When the distance between the first focal point and the second focal point is expressed by '2C', and the distance, between the first focal point of the oval mirror and the light valve, which governs the effective light flux area of the light valve is expressed by 'L', the relation between 'L' and 'C' satisfies the following inequality (1):

$$0.6 < (L/C) < 1.1 \quad (1)$$

According to the foregoing structures, it will be possible to produce a projection type image display apparatus which displays images of high brightness, uniform light intensity, enhanced contrast and the like. The projection-type image display apparatus employs a light valve system that may provide room for a reduction in the size of the apparatus.

An oval mirror having an ellipticity "E" of 0.95 to 0.97 is desirable.

When the shorter ellipse axis of the oval mirror is expressed by '2B' in maximum and the maximum diameter of the effective light flux area of the light valve is expressed by 'D' the relation between 'B' and 'D' preferably satisfies the following inequality (2):

$$1.9 < (B/D) < 2.5 \quad (2)$$

The light emitting area of the light source preferably has a size of more than 2.5 mm extending along the light axis of the oval mirror.

Preferably, the F-Number of the projection lens should be more than 3.0.

When the longer ellipse axis of the oval mirror is expressed by '2A' in maximum and the distance between two focal points of the oval mirror is expressed by '2C', the relation between 'A' and 'C' preferably satisfies the following inequality (3):

$$8.0 \text{ mm} < (A-C) < 11.0 \text{ mm} \quad (3)$$

The light emitting area of the light source has an elongated shape extending along the light axis of the oval mirror, and the first focal point of the oval mirror is within the light emitting area of the elongated shape. The ratio of the distance from the first focal point to the second focal point's side of the light emitting area to the distance from the first focal point to the opposite side of the light emitting area is preferably not less than 2 to 1 with a resulting shift of the light emitting area towards the second focal point of the oval mirror.

The light valve is preferably a liquid crystal panel and images are displayed by controlling the liquid crystal panel electrically.

According to the foregoing structures, it is possible to realize a projection type image display apparatus having superior characteristics as described above.

Figure 1:
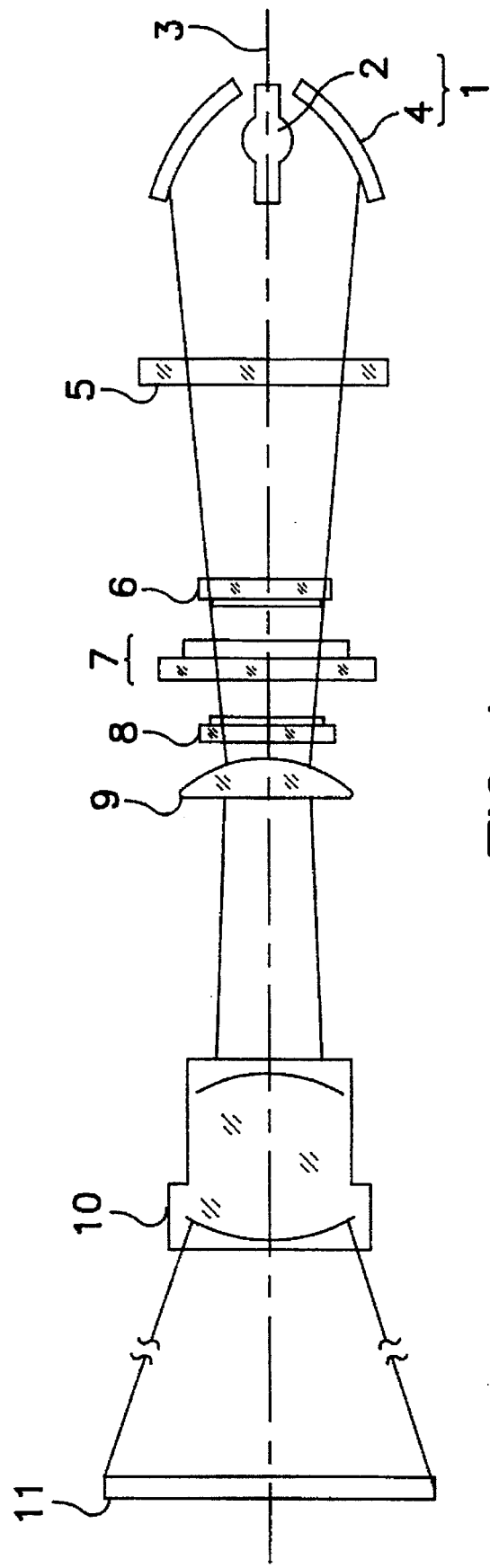
FIG. 1 shows a schematic diagram of the principal elements of a projection type image display apparatus in an exemplary embodiment of the present invention.

Key to Reference Numerals:

1. Illumination Means
2. Light Source
3. Light Axis
4. Oval Mirror (Oval Reflector)
5. Ultraviolet Rays Cutting Filter
6. Light Incident Side Polarizer
7. Light Valve
8. Light Radiant Side Polarizer
9. Light-Gathering Lens
10. Projection Lens
11. Screen
12. First Focal Point of Oval Mirror
13. Second Focal Point of Oval Mirror
215. Collimator Lens
16. Illuminating Area of Oval Mirror 17. Effective Area of Light Valve
18. Ellipse
102, 202. Light Source
103, 203. Light Axis
114, 314. Parabolic Mirror
204, 404. Oval Mirror
106, 206. Light Incident Side Polarizer
107, 207. Liquid Crystal Light Valve
108, 208. Light Radiant Side Polarizer
109, 209. Light-Gathering Lens
110, 210. Projection Lens

DESCRIPTION OF THE PREFERRED EMBODIMENTS

One of the exemplary embodiments of the present invention will be explained with reference to the drawings.

FIG. 1 shows a schematic diagram of the principal elements of a projection type image display apparatus in an exemplary embodiment of the present invention.

In FIG. 1, source of illumination 1, an ultraviolet rays cutting filter 5, a light incident side polarizer 6, a light valve 7, a light radiant side polarizer 8, a light-gathering lens 9, a projection lens 10 and a screen 11 are arranged along the light axis 3 successively.

The source of illumination 1 comprises a light source 2 and an oval mirror 4. The oval mirror 4 is disposed at a position where the light axis 3 serves as a rotationally symmetrical axis.

The oval mirror 4 serves as a reflector whereby the light radiated from the light source 2 is reflected in a desired direction.

The ultraviolet component of the light radiated from the source of illumination 1 is eliminated by the ultraviolet rays cutting filter 5.

The light, free of the ultraviolet rays, is incident upon the light incident side polarizer 6 and the light component of the same vibration direction as the absorption axis direction of the light incident side polarizer 6 is absorbed, thereby allowing only a light component that makes an angle of 90° with the absorption axis of the light incident side polarizer 6 to pass through.

The light that has passed through the light incident side polarizer 6 is then incident upon the light valve 7. The light valve 7 is made from an electro-optically volatile liquid crystal. The light valve 7 has a plurality of openings, each of which can be independently controlled according to input signals provided from outside the light valve 7.

An electrical controller utilizing polysilicon or amorphous silicon thin films conveys the input signals to the light valve 7. When an input signal indicates black, the vibration direction of the light incident upon the liquid crystal light valve 7 is controlled so that the vibration direction is the same direction as the absorption axis direction of the light radiant side polarizer 8. Thus, the light that has passed through the light valve 7 is absorbed by the light radiant side polarizer 8 and consequently not radiated out of the light radiant side polarizer 8.

On the other hand, when an input signal indicates white, the vibration direction of the light incident upon the light valve 7 is controlled so that the vibration direction makes an angle of 90° with the absorption axis direction of the light radiant side polarizer 8. Thus, the light that has passed through the light valve 7 penetrates the light radiant side polarizer 8.

Thus, an image display device includes the ultraviolet rays cutting filter 5, the light incident side polarizer 6, the light valve 7 and the light radiant side polarizer 8, thereby forming images of the light controlled by the image display device.

The light that passed through the light radiant side polarizer 8 is projected on the screen by a projection device. More specifically, the light that passed through the light radiant side polarizer 8 is delivered to the projection lens 10 after being focused by the light-gathering lens 9. The light that passed through the projection lens 10 is projected on the screen 11 positioned in front of the projection lens 10, thereby projecting an enlarged version of the images formed on the light valve 7.

Accordingly, in order to obtain excellent projected images from a projection type image display apparatus using a light valve, all the following conditions relative to high brightness, uniform light intensity, enhanced contrast and the like have to be satisfied:

(1) High Brightness

It is possible for the light from the light source 2 to be gathered efficiently into the effective opening area of the light valve 7 and then for the gathered light to be guided to the projection lens 10.

(2) Uniform Light Intensity

It is possible to reduce the difference in light intensity between the central part and the peripheral part of the images projected on the screen and at the same time to have even the corners of the screen well illuminated.

(3) Enhanced Contrast

It is possible to make the light incident angles of both the light incident on the effective opening area of the light valve 7 and the light incident on the projection lens 10 after passing through the light-gathering lens 9 fall within a range set by the incident light angle dependence of the light valve 7 to satisfy a specified requirement for contrast.

Figure 2:
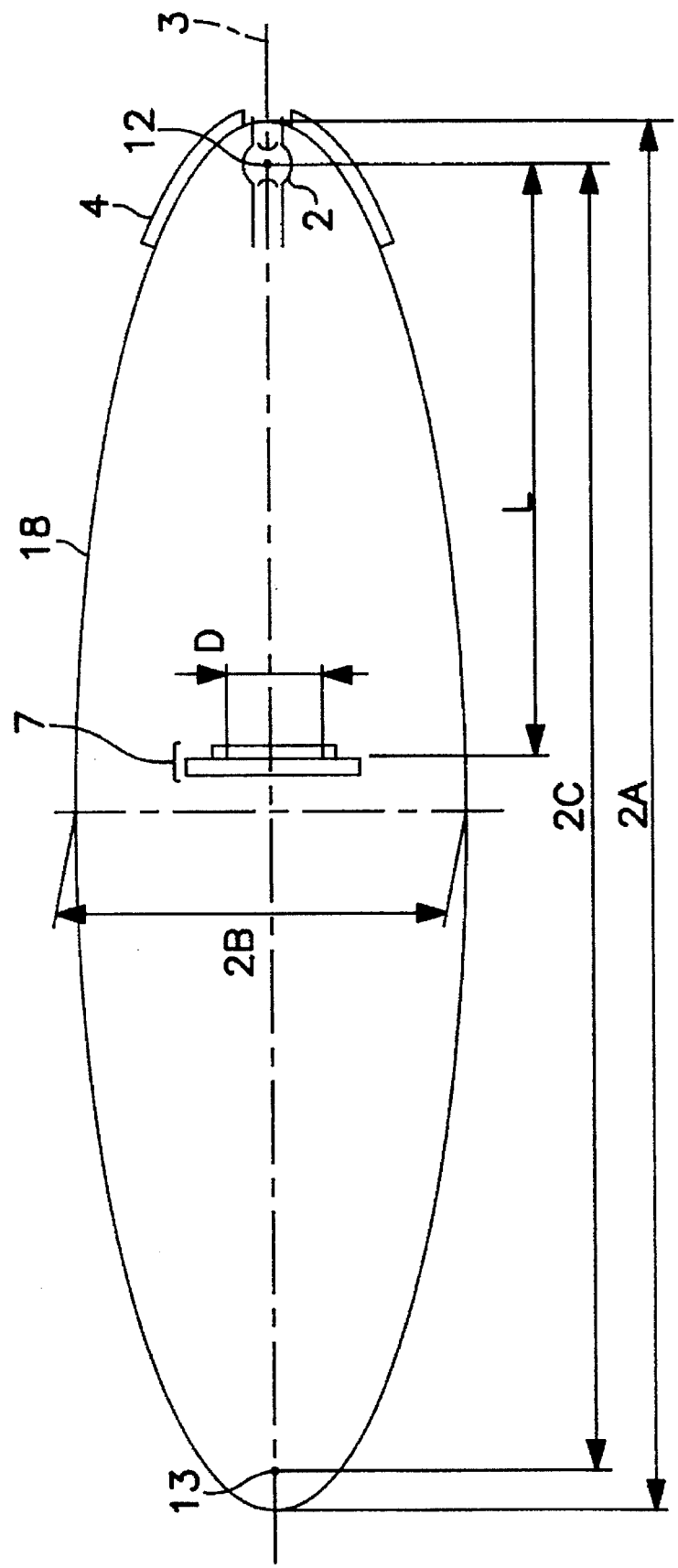
FIG. 2 illustrates an illumination means of a projection type image display apparatus in an exemplary embodiment of the present invention.

FIG. 2 illustrates in detail the illumination means of the projection type image display apparatus as shown in FIG. 1. In. FIG. 2, the oval mirror 4 has an opening having an elliptical configuration 18 with specific portions thereof cut out.

The oval mirror 4 has two focal points on the light axis 3 with a first focal point 12 located at the oval mirror side of light valve 7 and a second focal point 13 at the opposite side of the light valve 7.

A light source 2 is disposed near the first focal point 12. The light from the light source 2 is reflected by the oval mirror 4 towards the opening of the oval mirror 4. When the distance between the first focal point 12 and second focal point 13 is expressed by '2C', the distance 'L' between the first focal point 12 and the light valve 7, which governs the effective light flux area of the light valve 7, satisfies the relation expressed by an inequality (1).

$$0.6 < (L/C) < 1.1 \qquad (1)$$

According to the foregoing structures, a projection type image display apparatus, which has all the features of high brightness, uniform light intensity and an enhanced contrast and also compactness in size, is realized. When the ration L/C does not exceed 0.6, the light incident angle becomes large, thereby making it difficult to maintain an enhanced contrast and also reducing the light-gathering efficiency of the light valve 7.

When the ratio L/C exceeds 1.1, the luminous energy becomes strong in the central area and weak in the periphery of the effective opening of the light valve 7, thereby making it difficult to achieve uniform light intensity.

Particularly, the ellipticity 'E' of the oval mirror 4 is preferably in a range from about 0.95 to about 0.97, which improves performance greatly. When 'E' is less than 0.95, it is difficult for the light to gather in a small area, thereby reducing the effect of light-gathering efficiency enhancement. When 'E' is more than 0.98, the light incident angle becomes large, resulting in a reduction of the effect of enhancing contrast.

There are no particular restrictions imposed on the material of the oval mirror 4, and mirror-surfaced glass, metal or ceramics are typically used.

Specifically, when the shorter ellipse axis of the ellipse 18 forming the oval mirror 4 is expressed by '2B' in maximum and the maximum diameter of the area of the light flux incident on the effective opening of the light valve 7 is expressed by 'D', it is preferable that the relation between 'B' and 'D' satisfies an inequality (2).

$$1.9 < (B/D) < 2.5 \tag{2}$$

In this case, the light-gathering efficiency of the oval mirror 4 serving as a reflector is greatly improved. Also, even when a light source with such a large light emitting area such as a metal halide lamp is employed as the light source 2, a more uniform light intensity can be realized by having the locally high-intensity illumination mitigated. When the ratio B/D is smaller than 1.9, all the light cannot get into the effective opening of the light valve 7, thereby reducing the effect of improving the light-gathering efficiency. When the ratio B/D is larger than 2.5 inclusive, it becomes difficult for the light to hit the periphery of the light valve 7, making the peripheral areas thereof darker, resulting in a reduction of the effect to gain uniform light intensity.

The light source 2 comprises a luminous tube having a shape elongated along the light axis 3. The luminous tube has a light emitting area located in the central section, and the light emitting area has a length proportionate to the arc length (or the electrode length). The luminous tube is transparent. The light source 2 is a discharge tube such as a metal halide lamp, a xenon lamp or the like.

Particularly, a light source 2 with a light-emitting area which has an elongation of more than 2.5 mm along the light axis 3 is preferred. With elongation, images of more uniform light intensity can be realized.

When the dimension of the light emitting area is less than 2.5 mm in length, it becomes less effective in reducing the difference in light intensity between the central area and the peripheral areas of the surface of light valve 7, on which the light is incident.

Particularly, at least a part of the light emitting area of the light source 2 having an elongation extending along the light axis 3 of the oval mirror 4 includes the first focal point 12 of the oval mirror 4. The ratio of the distance along the light axis 3 from the first focal point 12 to the side of the light emitting area near the second focal point 13 to the distance from the first focal point 12 to the opposite side of the light emitting area is preferably not less than 2 to 1. According to this structure, a particularly high light-gathering efficiency is achieved, and at the same time the light intensity of the images projected on the periphery of the screen is greatly enhanced.

When the foregoing ratio relative to the position of the light source does not exceed 2 to 1, the luminous energy at the center of the light valve 7 is increased and the luminous energy in the periphery of the light valve 7 is decreased, thereby reducing the effect of achieving uniform light intensity with the light valve 7.

Further, use of a collimator lens is not necessarily needed with the present invention.

Next, a specific exemplary embodiment of the present invention will be explained.

The optimal structural combination of the elements of the present invention can be determined by tracing the light radiant from the light source located on the light axis 3 and simulating the condition of the light entering the incident surface of the light valve 7.

For example, suppose the following relations are established:

E=0.96, D=35 mm, B=77 mm, L=200 mm, C=200 mm, A=208 mm, B/D=2.2, L/C=1, the length of the light emitting area of the light source along the light axis (arc length)=4.0 mm and the positional ratio of the light emitting area coincident with the first focal point (the distance from the first focal point to the second focal point side/the distance from the first focal point to the oval mirror side)=4/1.

Figure 4:
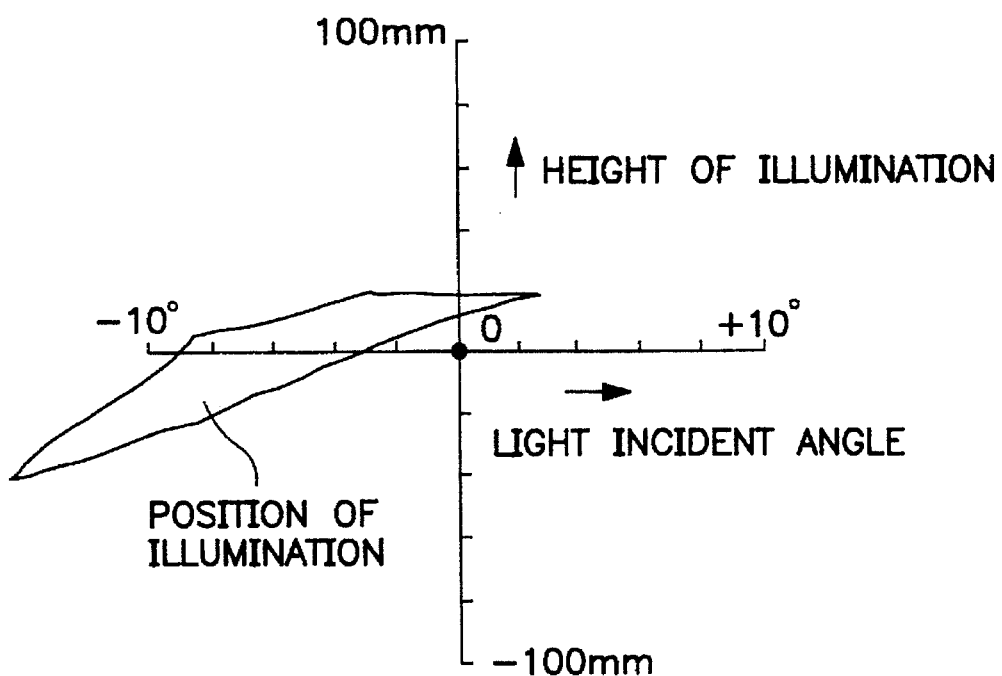
FIG. 4 is a simulation diagram showing the relationship between light incident positions and light incident angles on the surface of a light valve used in a projection type image display apparatus in an exemplary embodiment of the present invention.

Then, the relation between the position of the incident light on the light valve's surface (illumination height) and the incident angle is simulated and the results thereof are presented in FIG. 4.

FIG. 4 shows the relationship between the illumination height observed on a cross-sectional plane of the oval mirror situated above the central axis running through the focal points of the oval mirror and the light incident angles.

FIG. 4 shows that excellent performance can be obtained when the light mainly falls in the range of −20 mm to +20 mm of illumination height and the incident angle has a maximum value of 8°.

In other words, the present invention makes it possible to reduce the incident angle of the light incident on the effective opening area of the light valve 7.

Thus, the prevention of deterioration in contrast due to the liquid crystal's dependence on the incident angle of the light is made possible. As a result, the contrast of the images is improved remarkably.

According to the foregoing structures, practical viable light intensity can be realized even with a projection type image display apparatus that employs a projection lens of F-Number exceeding 3.0 (F=3.5 or 4.0, for example).

As a result, the distance from the opening of the oval mirror 4 to the projection lens 10 is made smaller, and the whole apparatus can be made more compact. Therefore, a projection type image display apparatus comprising a zoom lens, which enhances freedom in lens designing such as axis shifting and the like, can be realized.

Further, the present exemplary embodiment makes the effective opening area of the light valve 7 sufficiently smaller than the opening of the oval mirror 4. Otherwise, the luminous energy in the periphery of the light valve 7 becomes insufficient when the effective opening area of the light valve 7 is almost equal to the size of the opening of the oval mirror 4.

At present, a metal halide lamp of 120 to 250 W is mainly used as the light source of a projection type image display apparatus using a transmission type liquid crystal light valve.

To preserve the durability of a reflector, there has to be a certain distance between a light source and a reflector. Generally, the inner surface of a reflector is covered by a reflective film, and this reflective film peels off with an excessive rise in temperature over the maximum permissible temperature. Besides, there is a danger that the reflector itself will be destructed.

Therefore, it is necessary to maintain a certain distance between the light source and the reflector to keep the reflector cool.

9

In the present exemplary embodiment, when the longer ellipse axis of the ellipse 18 forming the oval mirror 4 is expressed by '2A' in maximum and the distance between the first focal point and the second focal point is expressed by '2C', it was found by experiment that the relation between 'A' and 'C' satisfies the following inequality (3):

$$8.0 \text{ mm} < (A-C) < 11.0 \text{ mm} \tag{3}$$

By setting the distance between the light emitting area of the light source and the reflecting surface of the oval mirror 4 so that the inequality (3) is satisfied, the deterioration in the durability of the reflector surface due to a temperature rise can be prevented.

Also, by reducing the value of 'A–C', the opening area of the oval mirror 4 can be made smaller, thereby allowing the incident angle of the light incident on the light valve 7 to be made smaller.

In the foregoing description of the present exemplary embodiment, 'the effective light flux area of the light valve' means the same as 'the effective opening area of the light valve'.

Next, a specific exemplary embodiment of the present invention and some comparative examples will be explained.

Specific Exemplary Embodiment

A projection type image display apparatus in the present exemplary embodiment is constructed in the same way as shown in FIG. 1 and FIG. 2, wherein the following numbers or values are used:

D=40 mm, L=200 mm, E=0.96, B=77 mm, C=200 mm, A=203.8 mm, the effective angle of the light incident on the light valve=7.2° (corresponding to the projection lens F-Number of 4.0), the length of the light emitting area along the light axis=4.0 mm, the light radiant angle=90°; the positional ratio of the light emitting area coincident with the first focal point (the distance from the first focal point to the second focal point side end of the light emitting area/the distance from the first focal point to the oval mirror side end of the light emitting area)=4/1, L/C=1 and B/D=1.93.

In order to prevent the adverse effects caused by the heat from the light source, the distance between the top of the oval mirror 4 and the first focal point 12, (A–C), is 8.3 mm.

With this structure, the light-gathering efficiency of the oval mirror is about 60%, which is much higher than that of an oval mirror used in a comparison example 1 (to be described later) and almost equal to that of another comparison example 2 (to be described later) wherein the light valve 7 is disposed on the second focal point.

Figure 3:
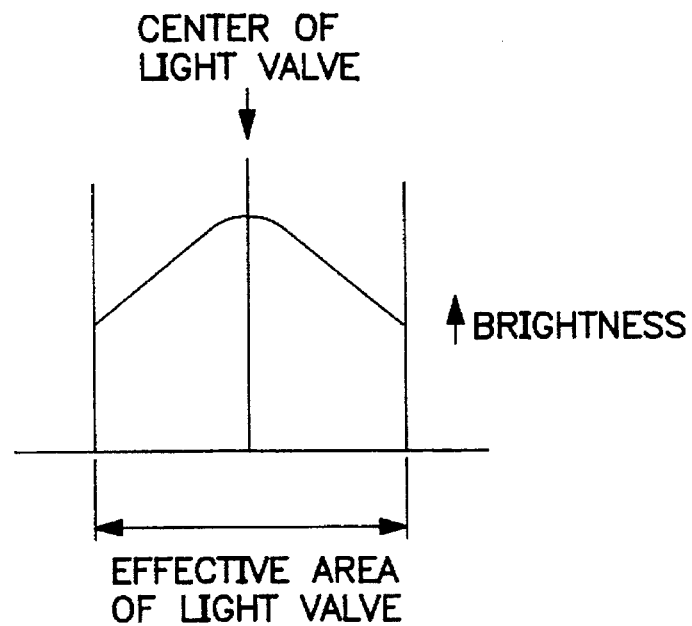
FIG. 3 shows a brightness distribution on the surface of a light valve used in a projection type image display apparatus in an exemplary embodiment of the present invention.

A brightness distribution on the surface of the light valve 7 is shown in FIG. 3.

As shown in FIG. 3, the difference in brightness between the center and the periphery of the light valve 7 is small. In other words, the uniformity in brightness on the surface of the light valve 7 has been improved remarkably.

The reason it is preferable for the value of L/C to be in the range of 0.6 to 1.1 is described below.

Figure 5:
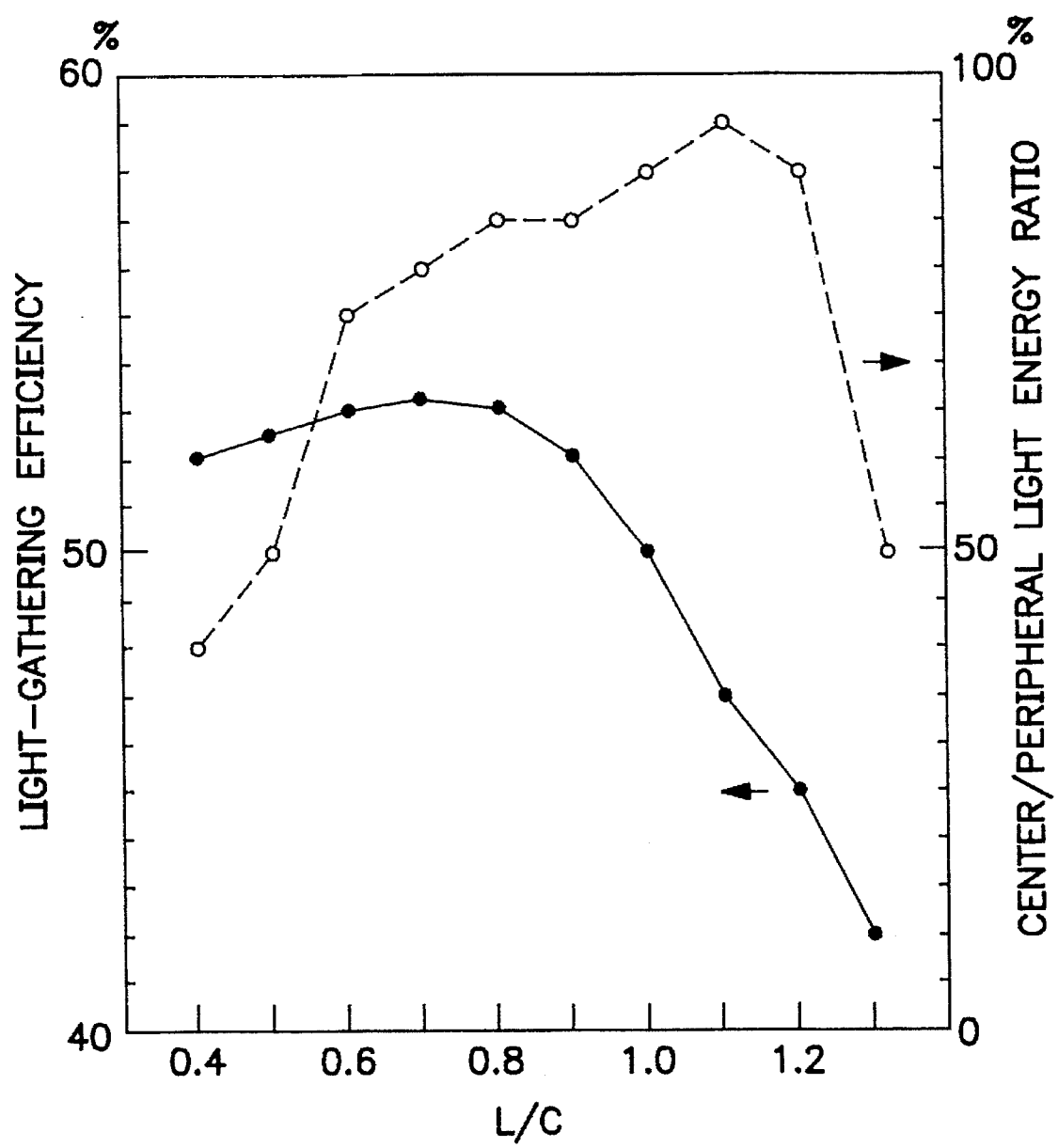
FIG. 5 is a graph showing the relationship between the focal distance of an oval mirror and a position of a light valve and the light-gathering efficiency, and also the relationship between the focal distance of an oval mirror and a position of a light valve and the center/peripheral luminous energy ration.

FIG. 5 shows the light-gathering efficiency and also the center/peripheral luminous energy ratio versus the value of L/C.

In FIG. 5, the simulated data was derived under the conditions of A=250 mm, D=33 mm, E=0.96, the arc length=4 mm, the positional ratio of the light emitting area coincidental with the first focal point (the distance from the first focal point to the second focal point side end of the light emitting area/the distance from the first focal point to the oval mirror side end of the light emitting area=2/1), and the incident angle<72°. FIG. 5 shows that the value of L/C is preferably in a range from 0.6 to 1.1 in order to achieve a good balance between the light-gathering efficiency and the center/peripheral luminous energy ratio.

Figure 6:
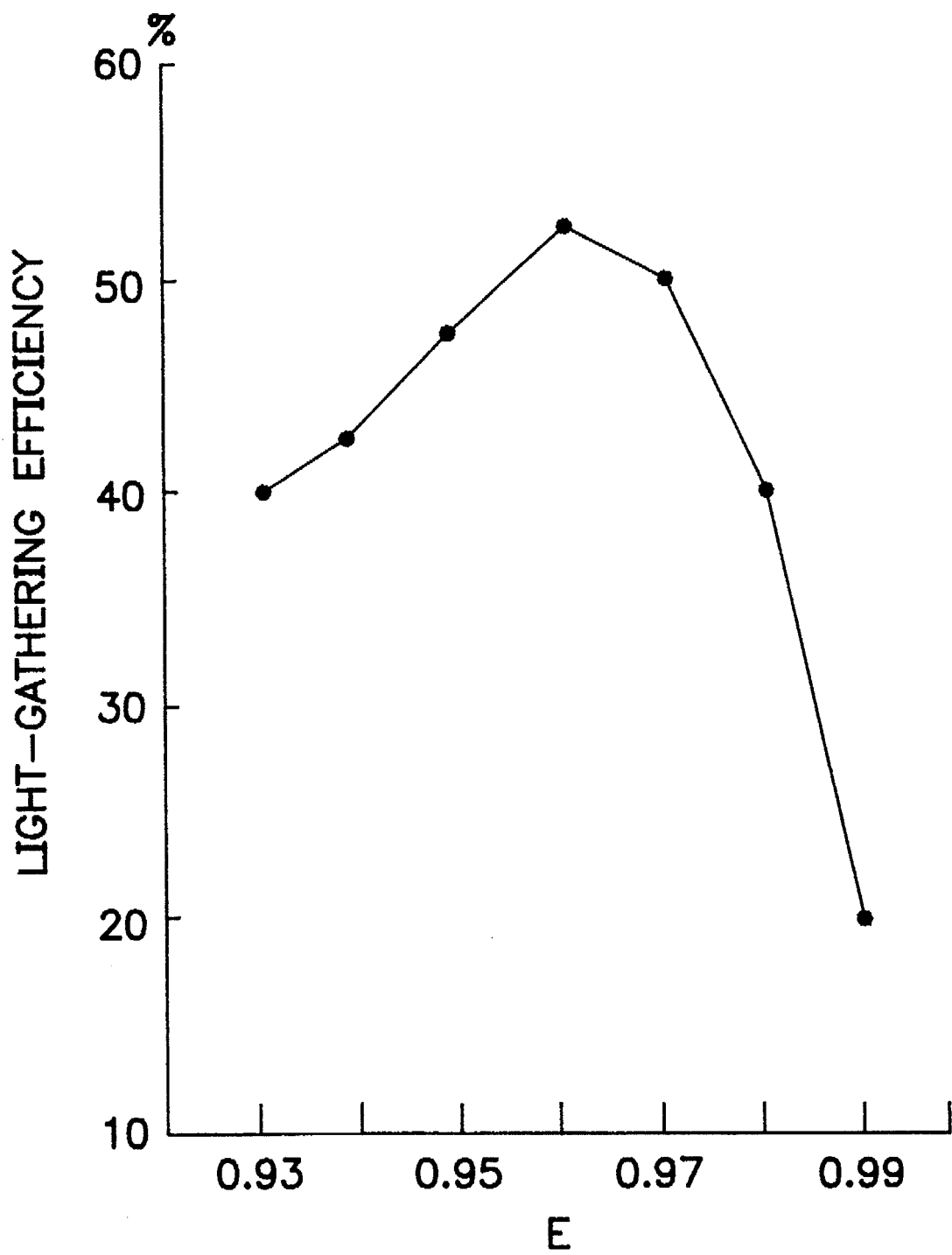
FIG. 6 is a graph showing the relationship between ellipticity and light-gathering efficiency.

FIG. 6 is a graph showing the relationship between the ellipticity 'E' of the oval mirror and the light-gathering efficiency.

In FIG. 6, the simulated data was derived under the conditions of A=250 mm, D=33 mm, L/C=0.85, the arc length=4 mm, the positional ratio of the light emitting area coincidental with the first focal point=2/1 and the incident angle <72°.

FIG. 6 shows that the ellipticity 'E' is preferably in a range from 0.95 to 0.97. If E=0.972, then C equals to 242.5 mm, resulting in (A–C)=7.5 mm. In other words, as described before, the effect of enhancing the durability of the reflector is reduced.

COMPARATIVE EXAMPLE 1

Against the foregoing specific exemplary embodiment of the present invention, the results of simulated light-gathering efficiency and brightness distribution measured with a prior art projection type image display apparatus will be explained next.

Figure 7A:
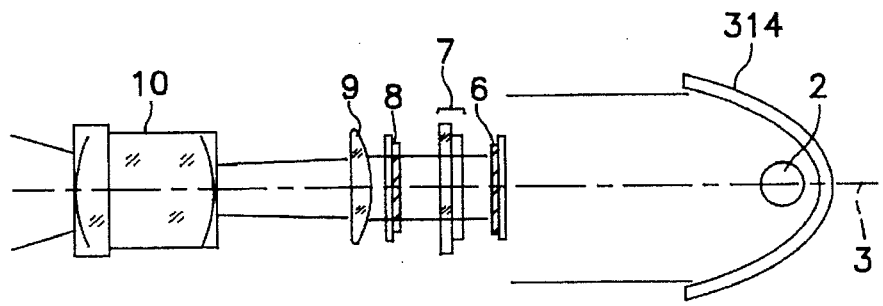
FIG. 7A shows a schematic diagram of the principal elements of a prior art projection type image display apparatus using a parabolic mirror.

FIG. 7A illustrates how the main components are put together to build a prior art projection type image display apparatus using a parabolic mirror as the reflector. In FIG. 7A, a parabolic mirror 314 is used as the reflector. Other structures are the same as described in the foregoing specific exemplary embodiment. In order to prevent the adverse effects caused by the heat from the light source 2, the focus distance of the parabolic mirror 314 is designed to measure 11 mm.

Figure 7B:
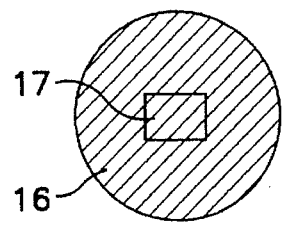
FIG. 7B illustrates the condition of illumination of the prior art projection type image display apparatus as shown in FIG. 7A.

FIG. 7B shows how the surface of the light valve 7 used in the image display apparatus in FIG. 7A is illuminated. In FIG. 7B, the illumination area 16 illuminated by the parabolic mirror becomes larger than the effective area 17 of the light valve, resulting in a light-gathering efficiency of about 15%. In other words, as the amount of light that is not effectively incident on the light valve 7 increases, the light-gathering efficiency of the reflector is reduced. More specifically, when a parabolic mirror 314 is used as the reflector and a small light valve 7 is used, the light-gathering efficiency, when a small light valve is irradiated by light, becomes low.

Figure 7C:
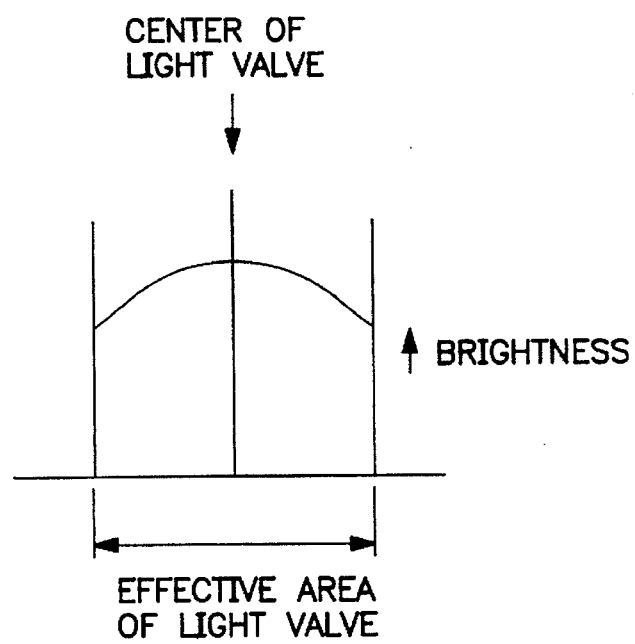
FIG. 7C shows a brightness distribution of the prior art projection type image display apparatus as shown in FIG. 7A.

On the other hand, the brightness distribution on the light valve 7 surface is shown in FIG. 7C. FIG. 7C shows that the difference in brightness between the center and the periphery of the light valve 7 is small, and the light valve 7 surface is uniformly irradiated by light.

COMPARATIVE EXAMPLE 2

Figure 8A:
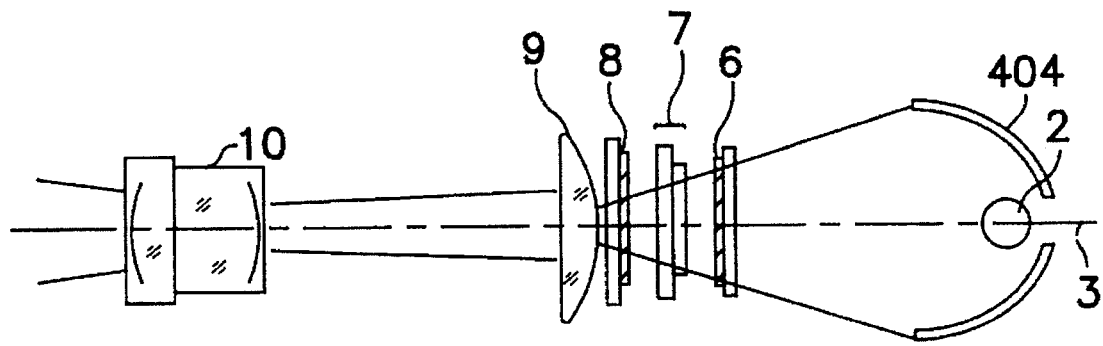
FIG. 8A is a schematic diagram illustrating the performance of a prior art projection type image display apparatus using an oval mirror which has a second focal point in the vicinity of the light incident surface of a light valve.

FIG. 8A illustrates how the main components are put together to build a prior art projection type image display apparatus using an oval mirror as the reflector.

In FIG. 8A, the second focal point is arranged to be located towards the light source 2 from the light valve 7. In other words, the ratio of L/C is about 2. In order to prevent the adverse effects caused by the heat from the light source 2, the distance between the top of the oval mirror 404 and the first focal point is 11 mm. The light source 2 is arranged to be located at the position of the first focal point, and the light valve 7 surface is arranged to be located at the position of the second focal point. Other structures are the same as described in the foregoing specific exemplary embodiment.

Figure 8B:
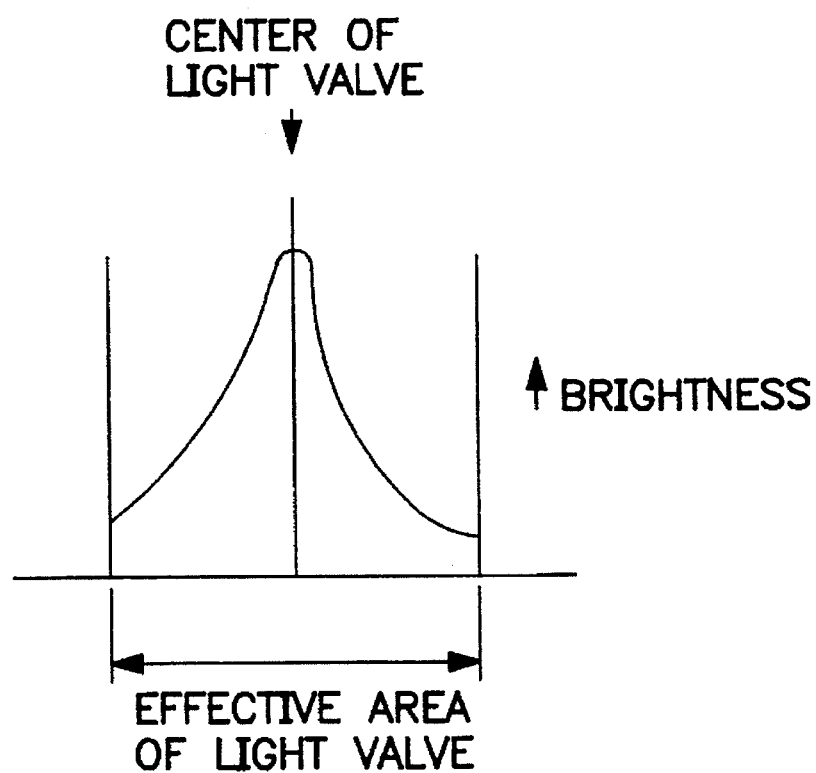
FIG. 8B shows a brightness distribution of the prior art projection type image display apparatus as shown in FIG. 8A.
Figure 9:
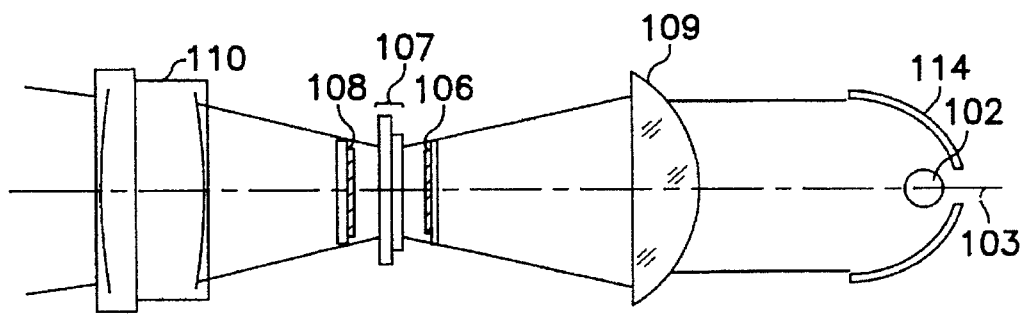
FIG. 9 shows a schematic diagram of the principal elements of a prior art projection type image display apparatus using a parabolic mirror.
Figure 10:
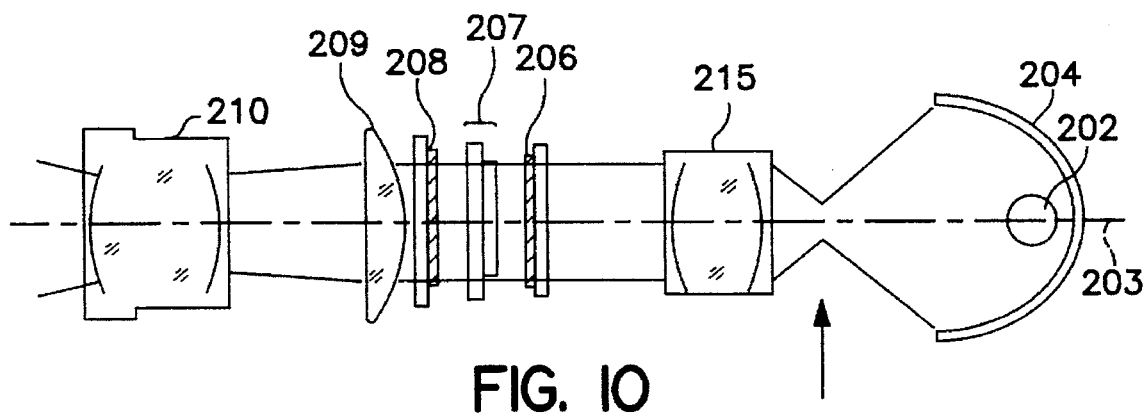
FIG. 10 shows a schematic diagram of the principal elements of a prior art projection type image display apparatus using a point source light and an oval mirror.

With the foregoing structures, the light-gathering efficiency of the oval mirror has become about 50%. However, as the brightness distribution on the light valve surface of FIG. 8B shows, the brightness in the periphery is lower than that at the center. Accordingly, the light valve surface is not illuminated uniformly. In addition, the light transmissivity of a projection lens 10 is reduced in the periphery when compared with that in the center, resulting in an enlarged difference in brightness between the center and the periphery of the screen.

As explained in the foregoing, by using an oval mirror as a reflector, and by making the distance 'L', from the first focal point of the oval mirror to a light valve, that governs the effective light flux area of the light valve and the distance '2C', between the first focal point and second focal point of the oval mirror, satisfy the relation expressed by inequality (1), it is possible to realize a projection type image display apparatus which has high brightness and sharp contrasts, and images of excellent uniformity and at the same time employs a small light 7 valve with a small-area effective surface. Also, it is possible to reduce the dimensions of the apparatus, thereby reducing the cost thereof.

$$0.6 < (L/C) < 1.1 \quad (1)$$

Particularly, a projection type image display apparatus comprising an oval mirror of ellipticity 'E' that ranges from 0.95 to 0.97 provides the foregoing excellent effects.

A projection type image display apparatus, wherein the maximum shorter axis length '2B' of an ellipse that forms an oval mirror and the maximum diameter 'D' of the effective light flux area of a light valve satisfy an inequality (2), has a particularly improved light-gathering efficiency.

$$1.9 < (B/D) < 2.5 \quad (2)$$

Further, a projection type image display apparatus including a projection lens of F-Number exceeding 3.0 makes it possible to realize brightness that is practical enough. Accordingly, a zoom lens with a shifting axis can be used with the image display apparatus. As a result, freedom in lens designing is increased and a projection type image display apparatus of much improved functions and maneuverability can be realized.

The scope of the present invention is not limited by the structures as described in the foregoing exemplary embodiments. For example, the light valve is not necessarily a transmission type liquid crystal panel. Any means functioning as a light valve such as a reflection type liquid crystal panel, a micro-mirror device (a conglomerate of tiny mirrors) or the like can also be used.

A projection type image display apparatus constructed with the light axis of the illumination optics system shifted from that of the projection optics system is also included in the present invention.

What is claimed:

1. A projection type image display apparatus comprising:

a) an illumination means including a light source having a light emitting area and a reflector for reflecting the light from said light source in one direction;

b) an image display means including a light valve for controlling the light from said illumination means according to external input signals; and c) a projection means including projection lens for projecting the light that passed through said image display means, wherein said reflector is an oval mirror with an opening, said oval mirror has two focal points, a first focal point being located on one side of the light valve near said oval mirror and a second focal point being located on the opposite side of said light valve, at least a part of said light emitting area is arranged to include said first focal point and said light valve is located at a position on the light axis connecting said reflector and said light valve to satisfy the following inequality:

$$0.6 < (L/C) < 1.1$$

wherein 'L' is the distance, from said first focal point to the light valve, that governs the effective light flux area of said light valve and '2C' is the distance from said first focal point to said second focal point.

2. The projection type image display apparatus according to claim 1, wherein the ellipticity 'E' of said oval mirror ranges from 0.95 to 0.97.

3. The projection type image display apparatus according to claim 1, wherein the maximum shorter axis length '2B' of an ellipse that forms said oval mirror and the maximum diameter 'D' of the effective light flux area of said light valve satisfy the following inequality:

$$1.9 < (B/D) < 2.5.$$

4. The projection type image display apparatus according to claim 1, wherein said light emitting area of the light source is elongated along the light axis of said oval mirror and has a length of greater than 2.5 mm.

5. The projection type image display apparatus according to claim 1, wherein the F-Number of said projection lens is greater than 3.0.

6. The projection type image display apparatus according to claim 1, where 'A' is one half of the maximum longer axis of an ellipse that forms said oval mirror, and 'C' and 'A' satisfy the following inequality:

$$8.0 \text{ mm} < (A-C) < 11.0 \text{ mm}.$$

7. The projection type image display apparatus according to claim 1, wherein said light emitting area has an elongated shape extending along said light axis and the ratio of the distance from said first focal point to the end of said light emitting area at the side nearest said second focal point to the distance from said first focal point to the opposite end of said light emitting area is not less than 2 to 1.

8. The projection type image display apparatus according to claim 1, wherein said light valve includes a liquid crystal panel and images are displayed by controlling the liquid crystal panel electrically.

* * * * *

UNITED STATES PATENT AND TRADE MARK OFFICE
CERTIFICATE OF CORRECTION

PATENT NO. : 5,624,172
DATED : April 29, 1997
INVENTOR(S) : Yamagishi

It is certified that error appears in the above-identified patent and that said Letters Patent is hereby corrected as shown below:

Title page, item [57] Abstract, last line, delete "$0.6 < (L/C( < 1.1$" and insert therefor $-- 0.6 \leq (L/C) \leq 1.1 --$.

Column 12, line 19, delete "$0.6 < (L/C) < 1.1$" and insert therefor $-- 0.6 \leq (L/C) \leq 1.1 --$.

Column 12, line 35, delete "$1.9 < (B/D) < 2.5$" and insert therefor $-- 1.9 \leq (B/D) \leq 2.5 --$.

Column 12, line 49, delete "$8.0 mm < (A-C) < 11.0 mm$" and insert therefor $-- 8.0 mm \leq (A-C) \leq 11.0 mm --$.

Signed and Sealed this

Twenty-eighth Day of October, 1997

Attest:

BRUCE LEHMAN

*Attesting Officer*   Commissioner of Patents and Trademarks